(12) United States Patent
Hatano et al.

(10) Patent No.: US 11,207,787 B2
(45) Date of Patent: **\*Dec. 28, 2021**

(54) GRIPPING DEVICE AND INDUSTRIAL ROBOT

(71) Applicant: NITTA CORPORATION, Osaka (JP)

(72) Inventors: Itaru Hatano, Yamatokoriyama (JP); Hirokazu Nitta, Yamatokoriyama (JP)

(73) Assignee: NITTA CORPORATION, Osaka (JP)

( \* ) Notice: Subject to any disclaimer, the term of this patent is extended or adjusted under 35 U.S.C. 154(b) by 109 days.

This patent is subject to a terminal disclaimer.

(21) Appl. No.: 16/650,930

(22) PCT Filed: Sep. 28, 2018

(86) PCT No.: PCT/JP2018/036345
§ 371 (c)(1),
(2) Date: Mar. 26, 2020

(87) PCT Pub. No.: WO2019/066001
PCT Pub. Date: Apr. 4, 2019

(65) Prior Publication Data
US 2020/0238541 A1    Jul. 30, 2020

(30) Foreign Application Priority Data

Sep. 29, 2017   (JP) .............................. JP2017-191204

(51) Int. Cl.
| | | |
|---|---|---|
| *B25J 15/10* | (2006.01) | |
| *B25J 9/00* | (2006.01) | |
| *B25J 15/00* | (2006.01) | |
| *B25J 15/08* | (2006.01) | |
| *B25J 15/12* | (2006.01) | |

(52) U.S. Cl.
CPC ............. *B25J 15/10* (2013.01); *B25J 9/0009* (2013.01); *B25J 9/0012* (2013.01);
(Continued)

(58) Field of Classification Search
CPC ........ B25J 15/0028; B25J 15/08; B25J 15/10; B25J 15/12; B25J 9/0009; B25J 9/0012
See application file for complete search history.

(56) References Cited

U.S. PATENT DOCUMENTS 4,671,553 A * 6/1987 Bertini .................... B25B 5/061
294/100
5,263,753 A * 11/1993 Breu .................... B25J 15/0206
294/196
(Continued)

FOREIGN PATENT DOCUMENTS

DE          4240814 A1    6/1994
DE         19816953 A1   10/1999
(Continued)

OTHER PUBLICATIONS

The extended European search report of EP application No. 18861892 dated May 25, 2021.

*Primary Examiner* — Edward Chang
*Assistant Examiner* — Joseph Aronson
(74) *Attorney, Agent, or Firm* — Muncy, Geissler, Olds & Lowe, P.C.

(57) ABSTRACT

A gripping device includes a bag-shaped gripping body, a plurality of elastic portions, and a shape holding portion. The gripping body includes a palm portion, and a plurality of finger portions protruding from a periphery of the palm portion and configured to fall toward the palm portion by deforming the palm portion in a thickness direction. The plurality of elastic portions is respectively provided in the plurality of finger portions, each of the plurality of elastic portions having a shape of each of the plurality of finger portions. The shape holding portion is provided in the gripping body to prevent contraction of an outer periphery of the palm portion. The shape holding portion includes a guide bore for receiving the palm portion when being deformed,
(Continued)

and a curved portion provided on an outer side of a distal end of the shape holding portion in an axial direction of the guide bore. The distal end faces the plurality of finger portions.

6 Claims, 10 Drawing Sheets

(52) U.S. Cl.
CPC ........... *B25J 15/0028* (2013.01); *B25J 15/08* (2013.01); *B25J 15/12* (2013.01)

(56) References Cited

U.S. PATENT DOCUMENTS

| | | | |
|---|---|---|---|
| 8,662,555 B2 * | 3/2014 | Weber .................. | B65G 47/905 294/198 |
| 10,875,196 B2 * | 12/2020 | Nitta ........................ | B25J 15/10 |
| 2004/0212206 A1 * | 10/2004 | Chang ................... | B81C 99/002 294/99.1 |
| 2017/0203443 A1 * | 7/2017 | Lessing ................ | B25J 15/0616 |

FOREIGN PATENT DOCUMENTS

| | | | | |
|---|---|---|---|---|
| DE | 102012001326 A1 | | 7/2013 | |
| DE | 102012100916 A | | 8/2013 | |
| EP | 3527337 A1 | | 8/2019 | |
| JP | 54047272 A | * | 4/1979 | |
| JP | S5447272 A | | 4/1979 | |
| JP | 2009125851 A | | 6/2009 | |
| JP | 2009279707 A | | 12/2009 | |
| JP | 2012192496 A | | 10/2012 | |
| JP | 2013523478 A | | 6/2013 | |
| JP | 2017185553 A | | 10/2017 | |
| JP | 2019147237 A | * | 9/2019 | .............. B25J 15/08 |
| WO | 2018070280 A | | 4/2018 | |

\* cited by examiner

GRIPPING DEVICE AND INDUSTRIAL ROBOT

TECHNICAL FIELD

The present invention relates to a gripping device and an industrial robot.

BACKGROUND ART

As gripping devices for gripping a workpiece, a suction hand and a two-finger gripper (for example, Patent Literature 1) are mainly used. Such devices sometimes cannot versatilely grip workpieces of different sizes or shapes in terms of their mechanisms. Thus, in work sites where a large variety of workpieces are gripped such as for production in small quantities and large varieties, replacement work using a tool changer or by manpower is required, thereby reducing production efficiency. Further, soft and undefined workpieces, typically such as food, cannot be gripped without being damaged.

In response to this, a five-finger gripping device having a mechanism similar to that of a human hand has been studied (for example, Patent Literature 2). However, a movement and a control mechanism of the five-finger gripping device are very complex to achieve a complex movement similar to that of a human hand, and such complexity causes difficulty in introducing the five-finger gripping device.

Further, a gripping device that includes a sealed bag and granular materials filling the rubber bag and uses jamming transition of the granular materials has been developed (for example, Patent Literature 3). This gripping device can grip a workpiece with the rubber bag following the workpiece, and thus can accommodate various workpieces with simple control.

CITATION LIST

Patent Literature

Patent Literature 1: Japanese Patent Laid-Open No. 2009-125851
Patent Literature 2: Japanese Patent Laid-Open No. 2012-192496
Patent Literature 3: National Publication of International Patent Application No. 2013-523478

SUMMARY OF INVENTION

Technical Problem

However, the gripping device in Patent Literature 3 needs be pressed against a workpiece with a strong force to exert a gripping force, and thus may damage a soft workpiece such as food. If the gripping device is pressed against the workpiece with a weak force, followability of the rubber bag to the workpiece is significantly reduced. Thus, the gripping device can grip limited workpieces only. Further, if the rubber bag bursts due to deterioration, breakage, or the like, the granular materials filling the rubber bag scatters and contaminates the workpiece. The granular materials are deteriorated by density changes due to the jamming transition, and cannot be stably used.

An object of the present invention is to provide a gripping device and an industrial robot that can more reliably grip a workpiece without using granular materials.

Solution to Problem

A gripping device according to the present invention includes a bag-shaped gripping body, a plurality of elastic portions, and a shape holding portion. The bag-shaped gripping body includes a palm portion, and a plurality of finger portions protruding from a periphery of the palm portion and configured to fall toward the palm portion by deforming the palm portion in a thickness direction. The plurality of elastic portions are respectively provided in the plurality of finger portions, each of the plurality of elastic portions having a shape of each of the plurality of finger portions. The shape holding portion is provided in the bag-shaped gripping body to prevent contraction of an outer periphery of the palm portion.

The shape holding portion is a frame-like member including a guide bore configured to receive the palm portion when being deformed, and a curved portion provided on an outer side of a distal end of the shape holding portion in an axial direction of the guide bore. The distal end faces the plurality of finger portions.

An industrial robot according to the present invention includes the gripping device.

Advantageous Effects of Invention

According to the present invention, the shape holding portion prevents contraction of the outer periphery of the palm portion, and thus the palm portion is deformed in the thickness direction to deform the finger portions toward the palm portion, thereby gripping a workpiece. Thus, the workpiece can be more reliably gripped without using granular materials. The shape holding portion includes the curved portion, and thus the palm portion is deformed in the thickness direction while coming into contact with the curved portion, thereby continuously and gently deforming the finger portions. Thus, the gripping device can softly grip the workpiece.

BRIEF DESCRIPTION OF DRAWINGS

Each of FIGS. 10A, 10B and 10C is a perspective view of Modified example (1) of the gripping body according to the embodiment.

Each of FIGS. 11A, 11B and 11C is a perspective view of Modified example (2) of the gripping body according to the embodiment.

Each of FIGS. 12A, 12B and 12C is a perspective view of Modified example (3) of the gripping body according to the embodiment.

DESCRIPTION OF EMBODIMENTS

Now, with reference to drawings, embodiments of the present invention will be described in detail.

(Overall Configuration)

Figure 1:
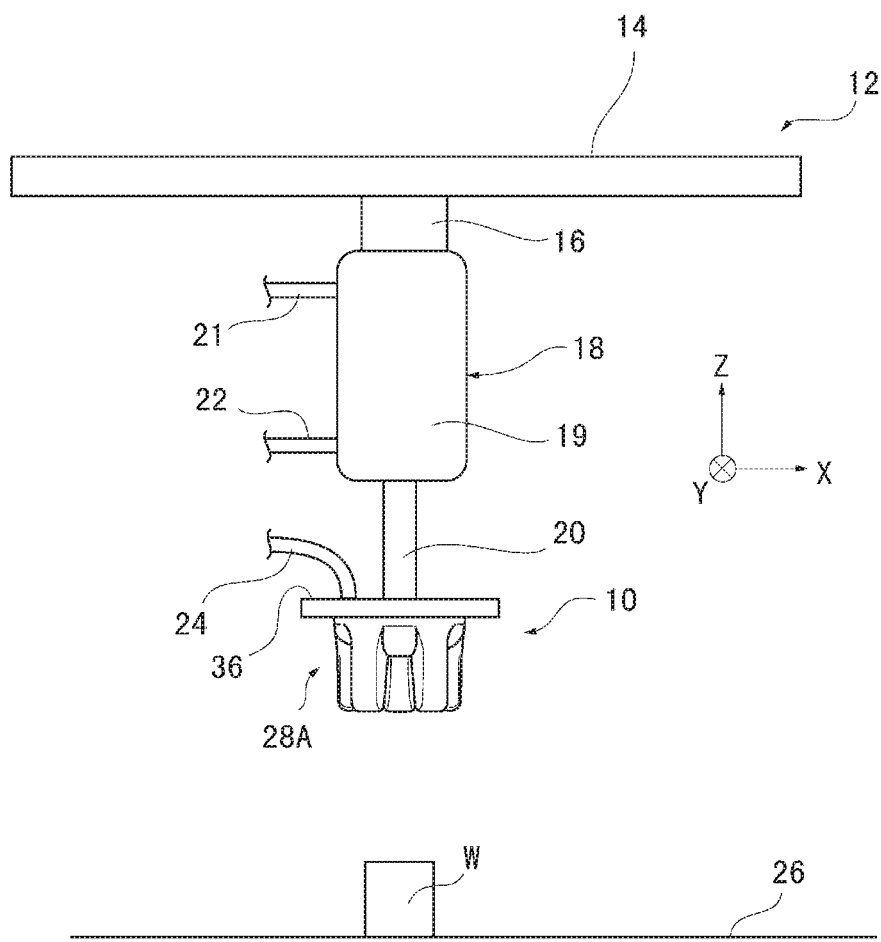
FIG. 1 is a schematic view of an example of an industrial robot to which a gripping device according to the embodiment is applied.

FIG. 1 shows a configuration of an industrial robot 12 to which a gripping device 10 according to the embodiment is applied. The industrial robot 12 is an orthogonal robot and includes a rail 14, a moving body 16 that moves along the rail 14, and an air cylinder 18 secured to the moving body 16. The rail 14 is provided movably in a Y-axis direction in FIG. 1.

The air cylinder 18 include a cylinder tube 19 and a piston rod 20 provided to be advanced from and retracted into the cylinder tube 19. The cylinder tube 19 includes pipes 21, 22. Air is supplied and exhausted through the pipes 21, 22 to allow the piston rod 20 to be advanced from and retracted into the cylinder tube 19. A gripping device 10 is provided at a distal end of the piston rod 20.

The industrial robot 12 can grip a workpiece W placed on a horizontal base 26 with the gripping device 10 and move the workpiece W in X-axis, Y-axis, and Z-axis directions.

The gripping device 10 includes a case 36 coupled to the piston rod 20 and a gripping body 28A secured to the case 36. A pipe 24 is coupled to the case 36. The gripping body 28A can be made of an airtight and elastic material, for example, natural rubber, synthetic rubber, or the like. Hardness of the gripping body 28A measured according to JIS K6253: durometer hardness test (type A) is preferably about 60 to 90.

Figure 2:
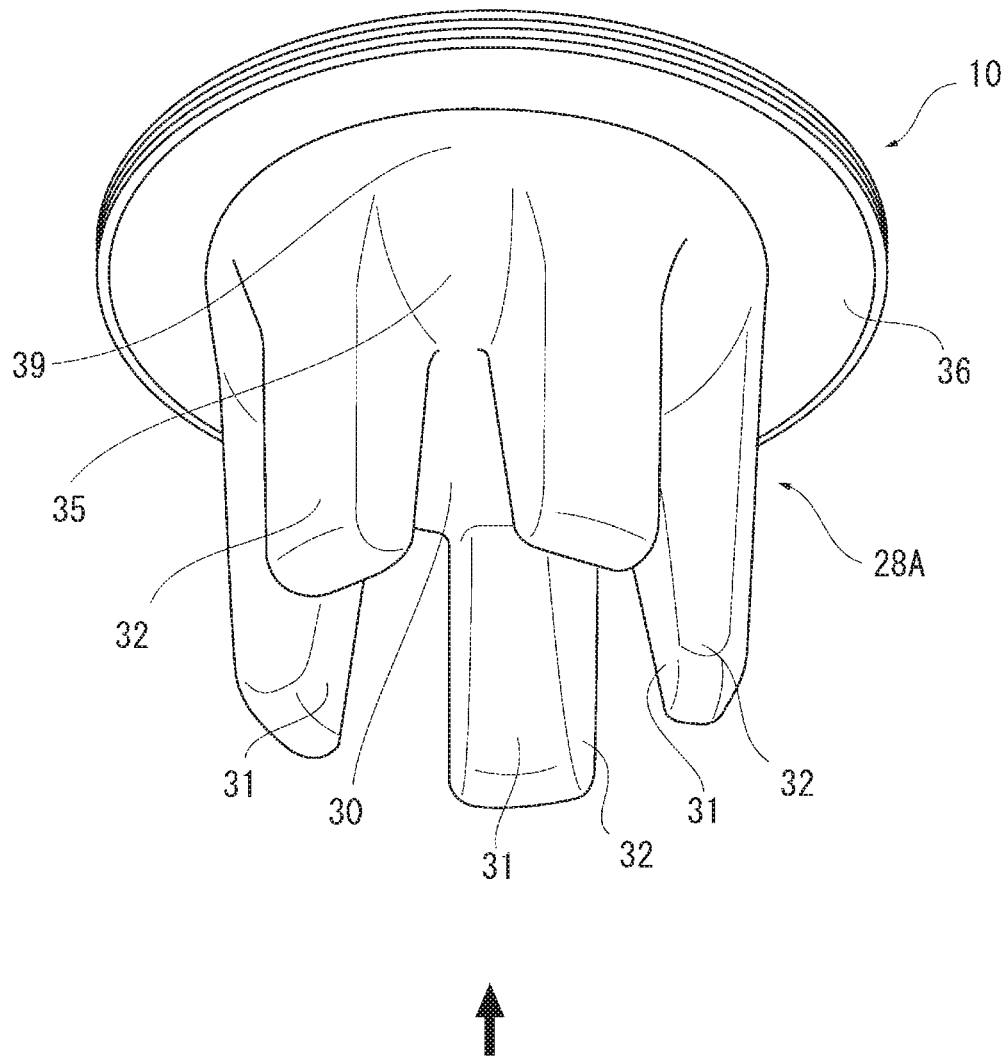
FIG. 2 is a perspective view of a configuration of the gripping device according to the embodiment.

As shown in FIG. 2, the gripping body 28A includes a palm portion 30, a plurality of finger portions 32 provided to protrude from a periphery of the palm portion 30, and a cylindrical outer peripheral surface 39 larger than an outer size of the palm portion 30. The palm portion 30 has a substantially disk shape. Five finger portions 32 are radially provided and integrated with the palm portion 30 so as to surround the palm portion 30. An outer periphery 35 is provided to form a predetermined interval between the finger portions 32. The outer periphery 35 connects the outer peripheral surface 39 and an outer edge of the palm portion 30, and integrates the outer peripheral surface 39, the palm portion 30, and the finger portions 32. The outer periphery 35 is inclined or curved to protrude outward. Inner surfaces 31 of the finger portions 32 are integrated with the palm portion 30. The finger portion 32 may have any outer shape, for example, a cylindrical shape, a conical shape, a truncated conical shape, a triangular prism shape, a quadrangular prism shape, a triangular pyramid shape, a square pyramid shape, a truncated quadrangular pyramid shape, or the like. In the embodiment, the finger portions 32 have the same shape. The plurality of finger portions 32 need not all have the same shape but may have different shapes. The finger portion 32 has a truncated quadrangular pyramid shape, and the inner surface 31 is formed to be inclined outward from a base end continuous with the palm portion 30 toward a distal end.

Figure 3:
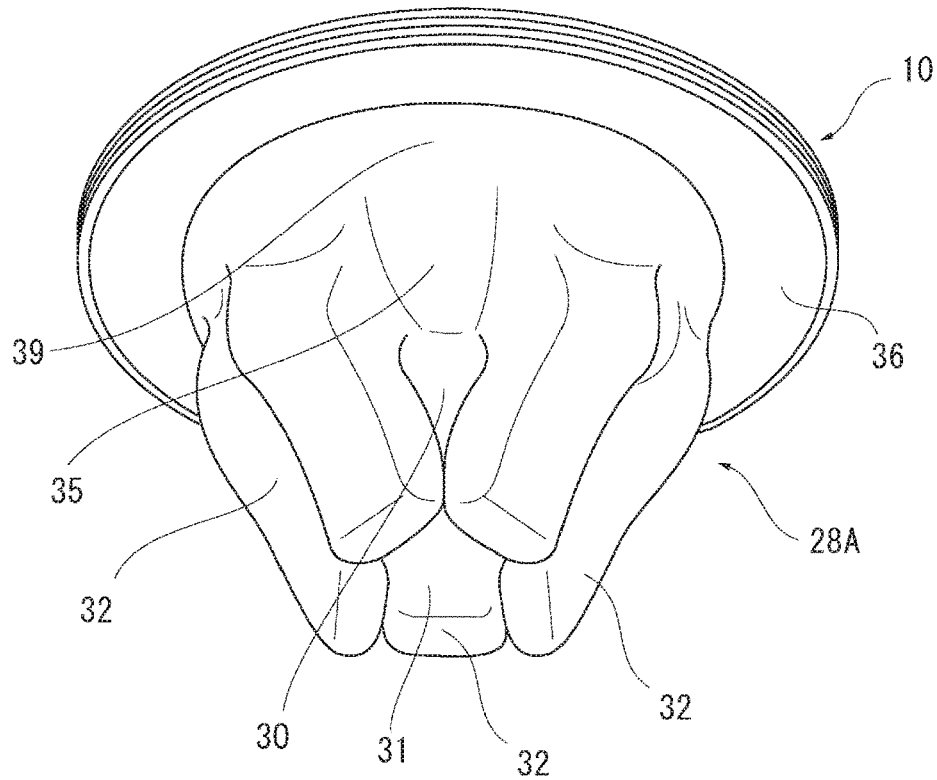
FIG. 3 is a perspective view of a use state of the gripping device according to the embodiment.

The gripping body 28A is configured so that a force is applied to the palm portion 30 in a thickness direction (an arrow direction in FIG. 2) to deform the palm portion 30, thereby pulling the inner surfaces 31 to elastically deform the finger portions 32 so as to fall toward the palm portion 30 (FIG. 3).

Figure 4:
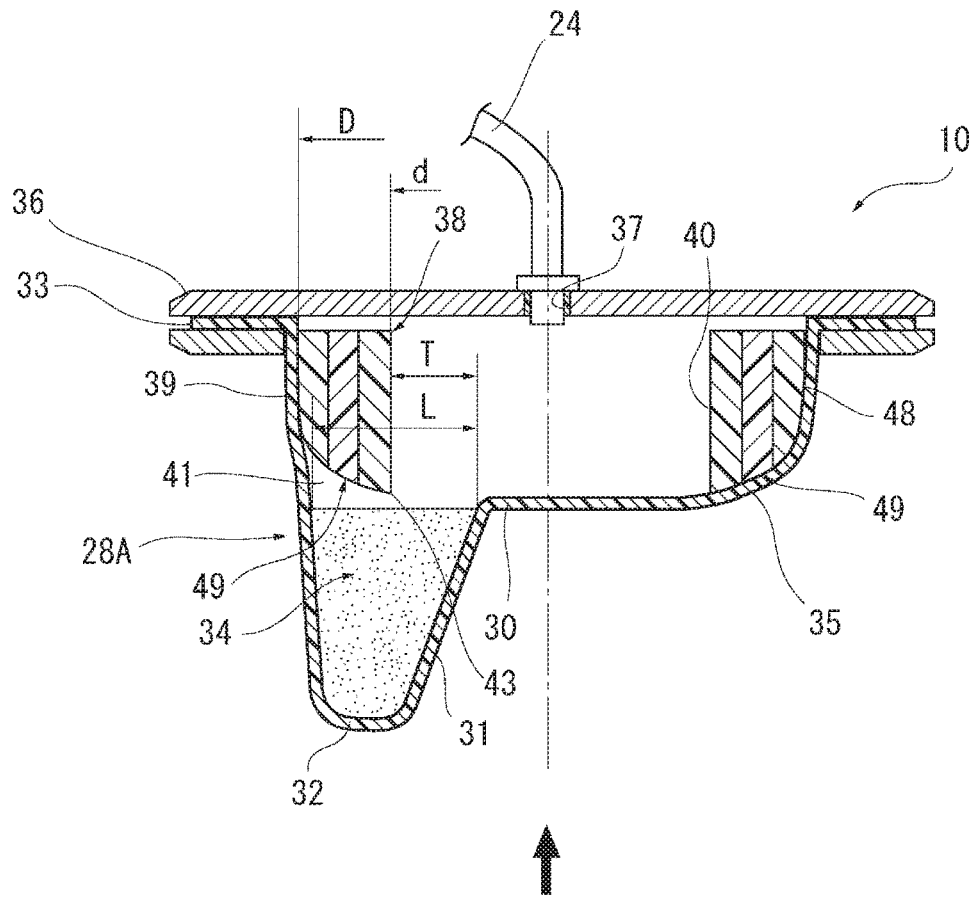
FIG. 4 is a partial vertical end view of the configuration of the gripping device according to the embodiment.

As shown in FIG. 4, the gripping body 28A is formed of a bag-shaped member having a circular opening in a surface opposite to a surface on which the palm portion 30 and the finger portions 32 are formed. The gripping body 28A includes therein elastic portions 34 and a shape holding portion 38. The gripping body 28A is secured to the case 36 at a flange portion 33 integrated with a peripheral edge of the opening, and the case 36 seals the opening.

The case 36 has a through hole 37. One end of the pipe 24 is inserted into the through hole 37 and leads to the gripping body 28A. The other end of the pipe 24 is connected to a vacuum pump, for example, via a three-way valve although not shown. The three-way valve includes a vacuum port, a supply and exhaust port, and an atmospheric release port. The vacuum port is connected to the vacuum pump, the supply and exhaust port is connected to the gripping device 10, and the atmospheric release port is connected to an outside. Through the pipe 24, air flows from inside to outside the gripping body 28A and from outside to inside the gripping body 28A.

The elastic portion 34 fills the finger portion 32 and has a shape of the finger portion 32. As long as the elastic portion 34 is inserted into the finger portion 32 of the gripping body 28A and can hold a certain shape, a little gap may be created between the elastic portion 34 and an inner surface of the finger portion 32. A material of the elastic portion 34 is preferably resin or rubber. A material of the elastic portion 34 needs not be always uniform but may be a composite of different materials. The elastic portion 34 may contain an additive such as a filler. The elastic portion 34 is preferably arranged without a gap from the inner surface of the finger portion 32. If the elastic portion 34 fills most of the gripping body 28A beyond the palm portion 30, the palm portion 30 is not deformed in the thickness direction, which makes it difficult for the finger portion 32 to be elastically deformed toward a center of the palm portion 30. Thus, the elastic portion 34 is preferably arranged in the finger portion 32.

The shape holding portion 38 is arranged in an internal space of the palm portion 30 of the gripping body 28A. The shape holding portion 38 holds the gripping body 28A so that a part other than the palm portion 30, that is, an outer periphery 35 of the palm portion 30 does not contract. In this embodiment, the shape holding portion 38 holds the gripping body 28A so that the outer periphery 35 and the outer peripheral surface 39 do not contract. A material of the shape holding portion 38 may be one that is not deformed when the pressure in the gripping body 28A is reduced, and may be, for example, rigid resin or metal. A material of the shape holding portion 38 needs not be always uniform but may be a composite of different materials.

The shape holding portion 38 in FIG. 4 is a frame-like member including a guide bore 40 that receives the deformed palm portion 30, and a curved portion 49 provided on an outer side of a distal end 43 of the shape holding portion in an axial direction of the guide bore 40. The distal end faces the finger portions 32. In the embodiment, the shape holding portion 38 is a cylindrical member having a holding surface 48 that holds an outer peripheral surface 39. It is preferable that the guide bore 40 is provided at a center of the shape holding portion 38 corresponding to the palm portion 30, and an inner diameter of the guide bore 40 is substantially equal to a size of the palm portion 30. The holding surface 48 is a circumferential surface of the outer side of the shape holding portion 38, has a size to hold the outer peripheral surface 39 of the palm portion 30, and is generally tapered toward the distal end. The curved portion 49 is provided in the holding surface 48 on the side of the finger portion 32. The curved portion 49 is an outer surface connecting a base end and the finger-portion-side distal end 43 of the shape holding portion 38. To prevent contraction of the outer periphery 35 of the palm portion 30, the curved portion 49 is shaped along the palm portion 30 between the finger portions 32, that is, inclined or curved to protrude outward. The curved portion 49 in FIG. 4 protrudes outward. More specifically, the curved portion 49 is an outer surface connecting the holding surface 48 and the distal end 43 and curved to protrude outward.

Figure 5:
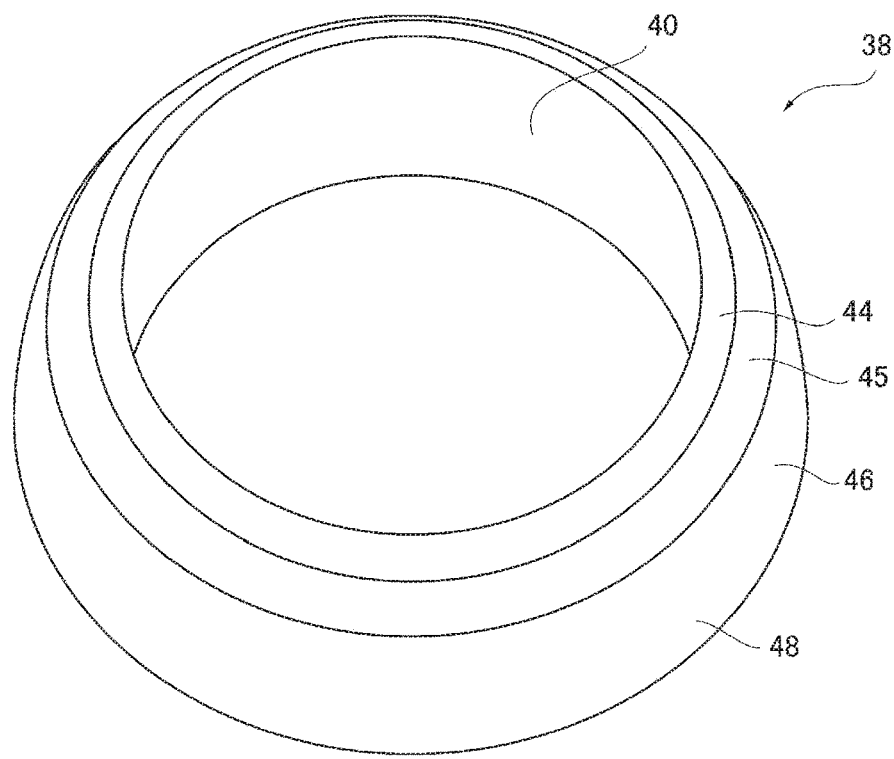
FIG. 5 is a perspective view of a configuration of a shape holding portion.

As shown in FIG. 5, the shape holding portion 38 includes a plurality of (three in FIG. 5) ring bodies 44 to 46 concentrically arranged. The ring bodies 44 to 46 are axially movable and removable.

The distal end 43 of the shape holding portion 38 on the side of the finger portion where the curved portion 49 and the guide bore 40 cross in a plane is preferably chamfered. For chamfering, the finger-portion-side distal end 43 of the shape holding portion 38 may be machined into a corner surface or a rounded surface. Chamfering the shape holding portion 38 can prevent damage such as a chip at the finger-portion-side distal end 43.

With reference to FIG. 4, the shape holding portion 38 will be described in more detail. A ratio of an outer diameter D of the shape holding portion 38 to an inner diameter d of the guide bore 40 is preferably 1.0:0.93 to 1.0:0.5. For example, when the outer diameter D of the shape holding portion 38 is 80 mm, the inner diameter d in the range of 60 to 70 mm allows the finger portion 32 to be more reliably elastically deformed toward the center of the palm portion 30.

Further, the distal end 43 of the shape holding portion 38 on the side of the finger portion is preferably located on a radially outer side of a center position of a base end of the elastic portion 34 in a plan view. Specifically, when a radial length of the elastic portion 34 is L, the distal end 43 of the shape holding portion 38 on the side of the finger portion preferably comes into contact with the base end of the elastic portion 34 at a distance T of L/2 or longer from an inner side of the elastic portion 34. When the distal end 43 of the shape holding portion 38 on the side of the finger portion comes into contact with the base end of the elastic portion 34 on a radially inner side of the center position of the elastic portion 34 (when T is shorter than L/2), it is difficult for the finger portion 32 to be elastically deformed toward the center of the palm portion 30.

(Operation and Effect)

Operation and effect of the industrial robot 12 including the gripping device 10 configured as described above will be described. At a starting point of the industrial robot 12, the piston rod 20 is retracted in the cylinder tube 19, and the air cylinder 18 is contracted. In the gripping device 10, pressure in the gripping body 28A is atmospheric pressure in an initial state. Specifically, the three-way valve is in such a state that the vacuum port is blocked and the supply and exhaust port is connected to the atmospheric release port.

In the industrial robot 12, the moving body 16 is moved along the rail 14 to position the gripping device 10 vertically above the workpiece W placed on the base 26 (FIG. 1). Then, in the industrial robot 12, the piston rod 20 is advanced from the cylinder tube 19 to extend the air cylinder 18 until the finger portions 32 reach a side surface of the workpiece W.

Then, the three-way valve is switched to a state where the atmospheric release port is blocked and the supply and exhaust port is connected to the vacuum port. Thus, the gripping device 10 sucks air in the gripping body 28A through the pipe 24, and reduces the pressure in the gripping body 28A to −0.03 MPa or lower.

Figure 6:
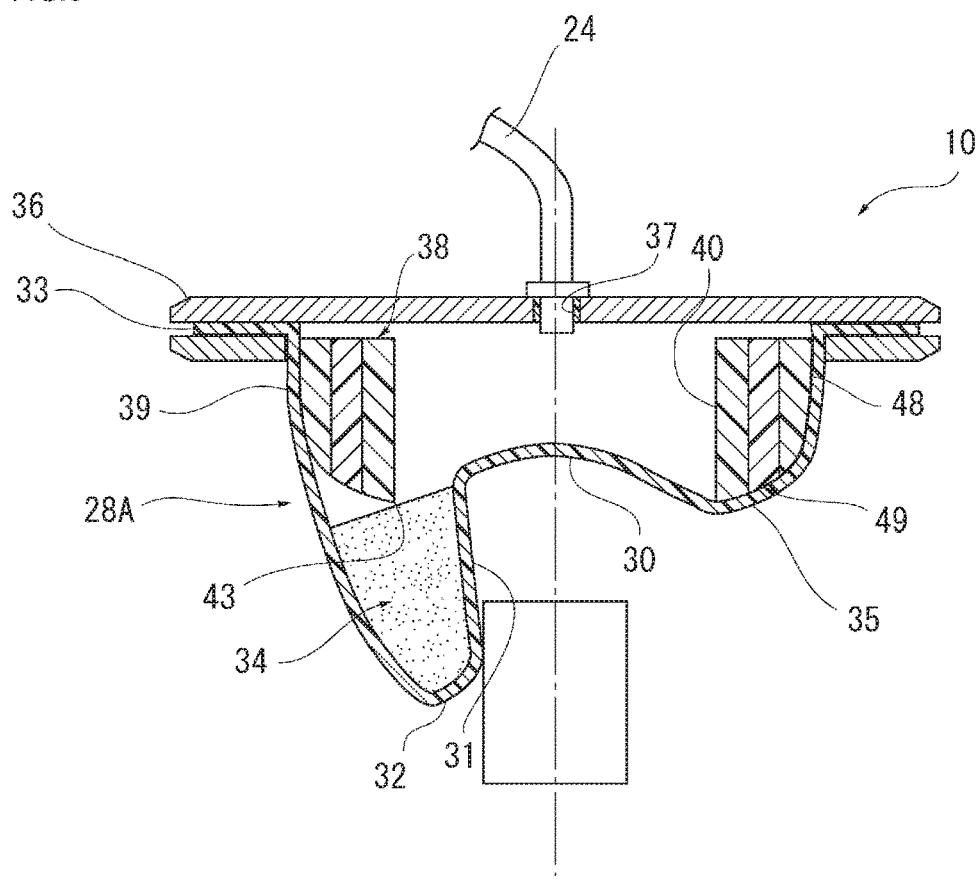
FIG. 6 is a partial end view of the use state of the gripping device according to the embodiment.

The gripping body 28A keeps holding the shape of the outer periphery 35 and the outer peripheral surface 39 by the shape holding portion 38. Then, the palm portion 30 is deformed in the thickness direction so as to be sucked into the guide bore 40 of the shape holding portion 38 (FIG. 6). As the palm portion 30 is deformed in the thickness direction, the inner surface 31 of the finger portion 32 is pulled toward the center of the palm portion 30. Then, the finger portion 32 is elastically deformed to fall toward the palm portion 30. Thus, the finger portion 32, mainly, the inner surface 31 comes into contact with a surface of the workpiece W. For the cubic workpiece W in FIG. 6, the finger portion 32 comes into contact with the side surface of the workpiece W. As described above, the gripping device 10 reduces the pressure in the gripping body 28A to grip the workpiece W. The gripping device 10 exerts a gripping force according to the pressure in the gripping body 28A. Specifically, the gripping force of the gripping device 10 increases with decreasing pressure in the gripping body 28A.

Then, in the industrial robot 12, the piston rod 20 is retracted into the cylinder tube 19 to contract the air cylinder 18, thereby allowing the workpiece W to be lifted from the base 26. Further, in the industrial robot 12, the moving body 16 is moved along the rail 14 or the rail 14 is moved in the Y-axis direction, thereby allowing the workpiece W to be freely moved in a horizontal direction.

After the workpiece is moved to a desired position, in the industrial robot 12, the piston rod 20 is advanced from the cylinder tube 19 to extend the air cylinder 18 until the workpiece W comes into contact with the base 26. Then, the three-way valve is switched to the state where the vacuum port is blocked and the supply and exhaust port is connected to the atmospheric release port. Then, air flows from the atmospheric release port through the pipe 24 into the gripping body 28A. As the pressure in the gripping body 28A returns to atmospheric pressure, the palm portion 30 is pressed out of the guide bore 40 and returns to its original state. As the palm portion 30 returns to its original state, the finger portions 32 are opened to release the workpiece W.

Then, in the industrial robot 12, the piston rod 20 is retracted into the cylinder tube 19 to contract the air cylinder 18 to separate the gripping device 10 from the workpiece W. In this manner, the industrial robot 12 can grip the workpiece W placed on the base 26 with the gripping device 10 to move the workpiece W to a desired position.

The gripping device 10 includes the elastic portion 34 having the shape of the finger portion 32 and the shape holding portion 38 in the gripping body 28A, and thus can more reliably grip the workpiece W without using granular materials. Since the gripping device 10 does not use granular materials, the workpiece W is not contaminated even if the gripping body 28A bursts.

The elastic portion 34 has the shape of the finger portion 32, and thus fits in the finger portion 32 even if the distal end of the finger portion 32 is directed downward, sideways, or upward. Thus, the gripping device 10 can lift the workpiece W on the base and also can grip the workpiece W suspended from a vertical wall surface or a ceiling. The elastic portion 34 having the shape of the finger portion 32 has higher rigidity than granular materials after jamming transition, thereby allowing the workpiece W to be more reliably gripped.

The gripping device 10 reduces the pressure in the gripping body 28A to reliably deform the palm portion 30 in the thickness direction, thereby gripping the workpiece W. Thus, there is no need to press the gripping body 28A against the workpiece W. Thus, the gripping device 10 can grip a soft workpiece W such as food without crushing the workpiece W, thereby preventing damage to the workpiece W.

The gripping body 28A can change an amount of deformation of the finger portion 32 and a gripping force according to a degree of reduction in pressure in the gripping body 28A. Thus, the gripping device 10 can change the gripping force according to a size or hardness of the workpiece W, thereby improving versatility. The palm portion 30 is deformed in the thickness direction so as to be sucked into the guide bore 40, and thus the finger portion 32 is deformed at a sharper angle toward the palm portion 30. This allows the gripping device 10 to grip a smaller workpiece W.

For the shape holding portion 38, the plurality of ring bodies 44 to 46 concentrically arranged can be removed as appropriate to change a size of the guide bore 40 and an outer size of the shape holding portion 38. Thus, choosing the ring bodies 44 to 46 to fit the size of the outer peripheral surface 39 or the palm portion 30 of the gripping body 28A can adjust the shape holding portion 38, thereby improving versatility. In the shape holding portion 38, a bore of the innermost ring body 44 is the guide bore 40, and a circumferential surface of the outer side of the outermost ring body 46 is the holding surface 48.

The shape holding portion 38 includes the curved portion 49, and thus the palm portion 30 is deformed in the thickness direction while coming into contact with the curved portion 49, thereby continuously and gently deforming the finger portions 32. Thus, the gripping device 10 can softly grip the workpiece W. In a gripping device including a shape holding portion without a curved portion, finger portions are deformed to be buckled.

(Modified Examples)

The present invention is not limited to the above embodiment, but may be changed as appropriate within the scope of the present invention.

In the above embodiment, the orthogonal robot is exemplified as the industrial robot 12. However, the present invention is not limited to this, but may be applied to a SCARA robot, an articulated robot, or the like. Specifically, the gripping device 10 can grip the workpiece W and keep the gripping state even if rotated around X, Y, and Z axes by the industrial robot.

The gripping body 28A may be made of one material or may be formed of a stack of films of a plurality of different materials. The gripping body 28A may be partially made of a different material. The gripping body 28A needs not have a fixed thickness, but may partially have a thick or thin portion.

The gripping body 28A may be integrated with the elastic portion 34. In this case, the gripping body 28A and the elastic portion 34 may be partially or entirely made of the same material or different materials.

The gripping device 10 may have a claw portion on the finger portion 32. The claw portion may be made of a plate-like member, a conical member, or a sack-like member of synthetic resin.

In the above embodiment, the shape holding portion 38 including the plurality of ring bodies 44 to 46 concentrically arranged has been described. However, the present invention is not limited to this, but the shape holding portion 38 may include one ring body. In the case of one ring body, the ring body preferably includes an air passage. In the case of one ring body, the shape holding portion 38 may be integrated with the gripping body 28A. The shape holding portion 38 is not limited to the cylindrical member, but may be a polygonal prism having a guide bore 40.

The case 36 may include a camera for taking an image of the workpiece W, a gravimeter for measuring a weight of the gripped workpiece W, a proximity sensor for measuring a distance between the workpiece W and the gripping body, or the like.

In the above embodiment, the shape holding portion 38 has the curved portion 49 over the entire circumference of the outer side at the distal end 43 on the side of the finger portion (FIG. 5). Thus, a space 41 is created between the curved portion 49, the elastic portion 34, and the inner side of the gripping body 28A (FIG. 4). If the pressure in the gripping body 28A in FIG. 4 is reduced, the gripping body 28A facing the space 41 is partially recessed.

Figure 7:
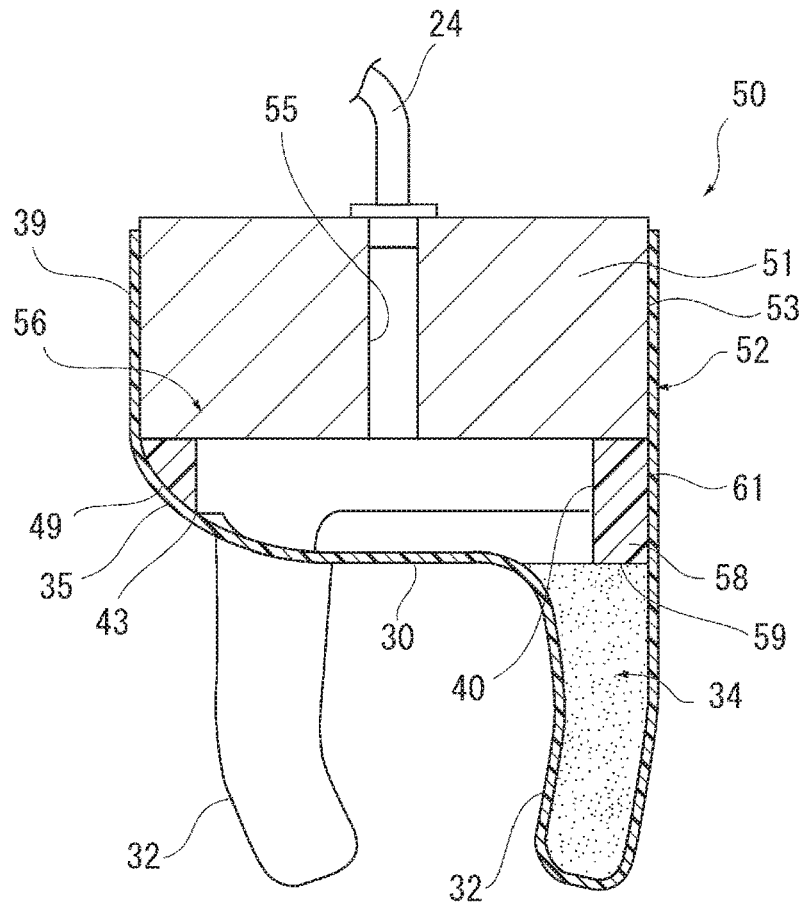
FIG. 7 is a vertical sectional view of Modified example (1) of the shape holding portion according to the embodiment being provided in a gripping body.

With reference to FIG. 7, a gripping device 50 with the space 41 being filled will be described. The same elements as those in the first embodiment are denoted by the same reference numerals and descriptions thereof are omitted. The gripping device 50 in FIG. 7 includes a case 51, a gripping body 52 mounted to the case 51, a shape holding portion 56 and an elastic portion 34 provided in the gripping body 52. The case 51 is a cylindrical member and has a channel 55 axially extending through the case 51. The case 51 is inserted into the gripping body 52 so as to close an opening of the gripping body 52. One end of the channel 55 is coupled to a pipe 24 and the other end is arranged in the gripping body 52. The gripping body 52 is fastened by a band (not shown) at the outer peripheral surface 39 and thus integrated with the case 51. The case 51 has a cylindrical holding surface 53 in a position corresponding to the outer peripheral surface 39.

Figure 8:
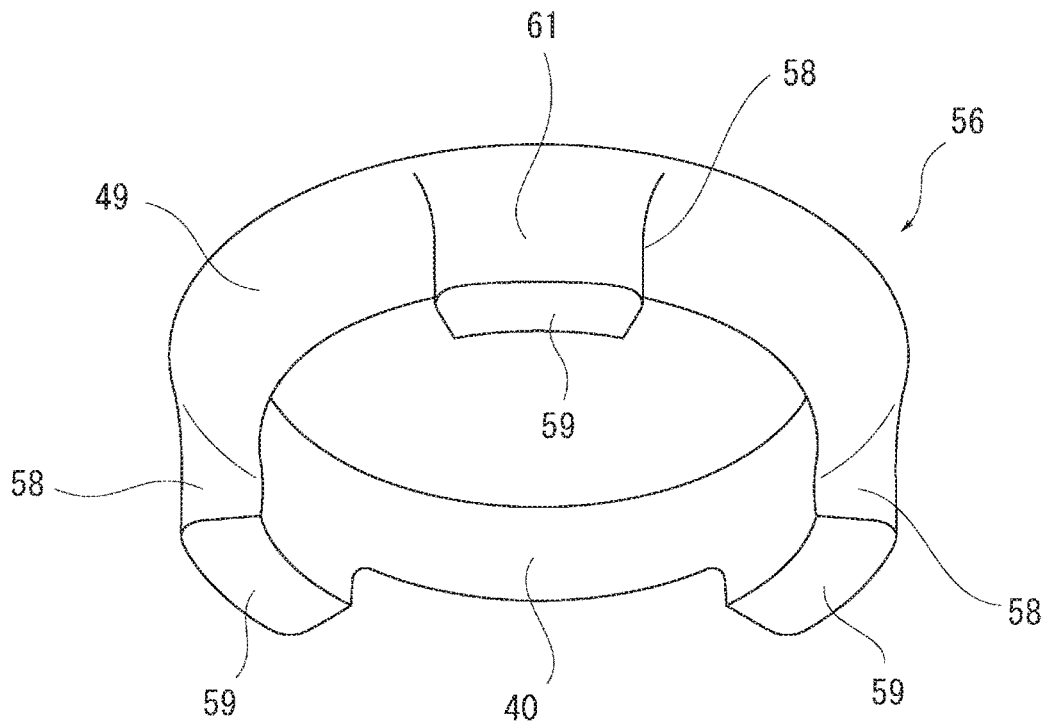
FIG. 8 is a perspective view of Modified example (1) of the shape holding portion according to the embodiment.

The shape holding portion 56 is a cylindrical member having a guide bore 40 and a curved portion 49, and arranged in a space between a distal end of the case 51 and a palm portion 30. As shown in FIG. 8, the shape holding portion 56 includes a protrusion 58 protruding toward a finger portion 32 in a position corresponding to the elastic portion 34. The shape holding portion 56 in FIG. 8 includes three protrusions 58 correspondingly to three finger portions 32.

Figure 9:
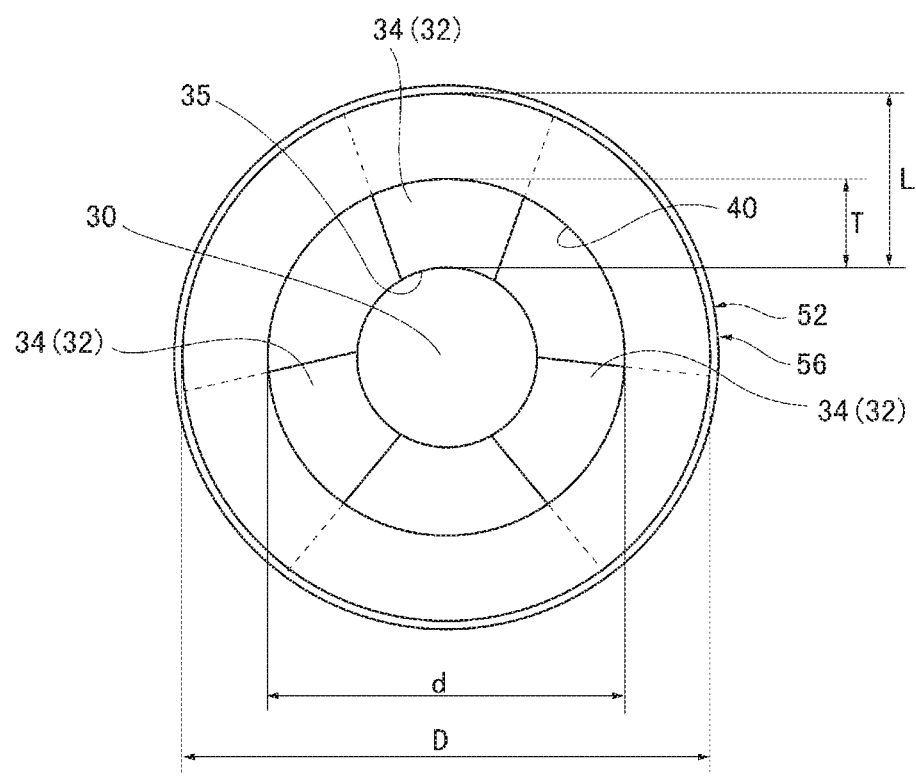
FIG. 9 is a plan view for detailed explanation of Modified example (1) of the shape holding portion according to the embodiment.

As shown in FIG. 9, a ratio of an outer diameter D of the shape holding portion 56 to an inner diameter d of the guide bore 40 is preferably 1.0:0.93 to 1.0:0.5. For example, when the outer diameter D of the shape holding portion 56 is 80 mm, the inner diameter d in the range of 60 to 70 mm allows the finger portion 32 to be more reliably elastically deformed toward a center of the palm portion 30.

Further, a distal end 43 of the shape holding portion 56 on the side of the finger portion is preferably located on a radially outer side of a center position of a base end of the elastic portion 34 in a plan view. Specifically, when a radial length of the elastic portion 34 is L, the distal end 43 of the shape holding portion 56 on the side of the finger portion preferably comes into contact with the base end of the elastic portion 34 at a distance T of L/2 or longer from an inner side of the elastic portion 34. When the distal end 43 of the shape holding portion 56 on the side of the finger portion comes into contact with the base end of the elastic portion 34 on a radially inner side of the center position of the elastic portion 34 (when T is shorter than L/2), it is difficult for the finger portion 32 to be elastically deformed toward the center of the palm portion 30.

When the shape holding portion 56 is assembled into the gripping body 52, a distal end 59 of the protrusion 58 comes into contact with the elastic portion 34 and a side surface 61 thereof comes into close contact with an inner surface of the gripping body 52, thereby eliminating a space between the elastic portion 34 and the inner surface of the gripping body 52. The shape holding portion 56 fills the space, thereby preventing a partial recess of the gripping body 52 when the pressure is reduced. Thus, the gripping device 50 including the gripping body 52 can more stably elastically deform the finger portion 32 and improve durability of the gripping body 52. The shape holding portion 56 includes the curved portion 49, and thus the gripping device 50 may have the same advantage as in the first embodiment.

Figure 10A:
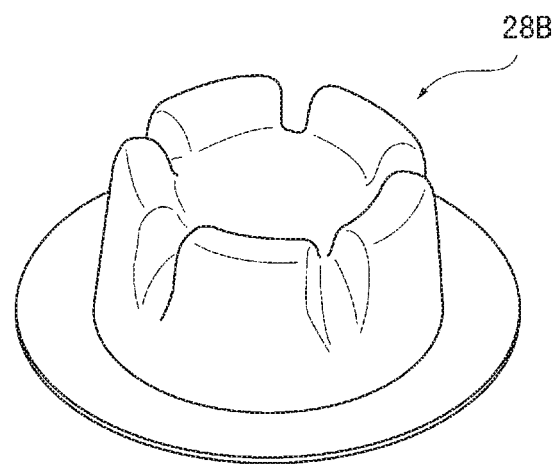
FIG. 10A shows finger portions having a short length.
Figure 10B:
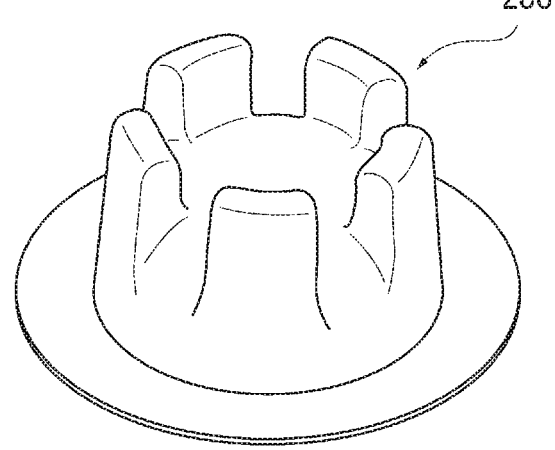
FIG. 10B shows finger portions having a medium length.
Figure 10C:
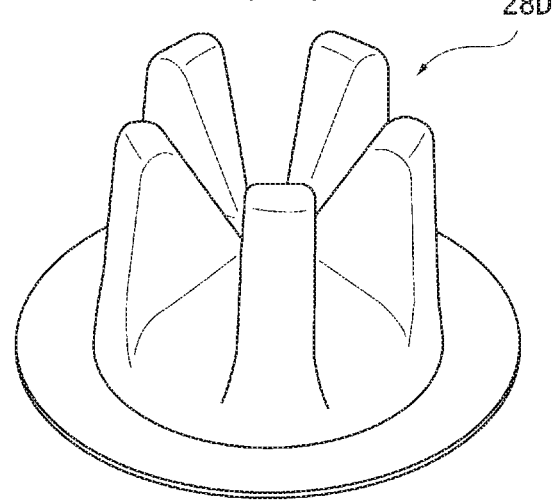
FIG. 10C shows finger portions having a long length.
Figure 11A:
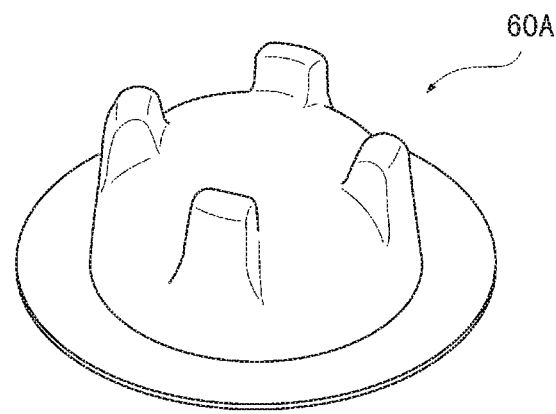
FIG. 11A shows finger portions having a short length.
Figure 11B:
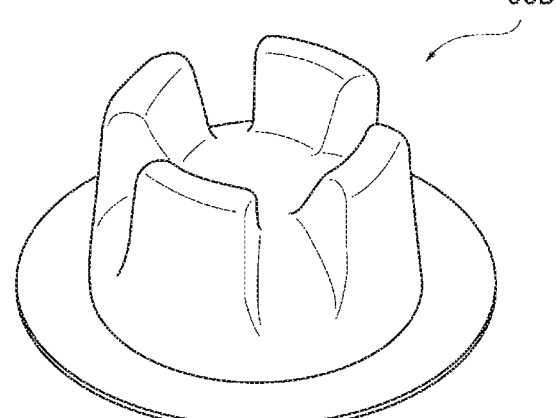
FIG. 11B shows finger portions having a medium length.
Figure 11C:
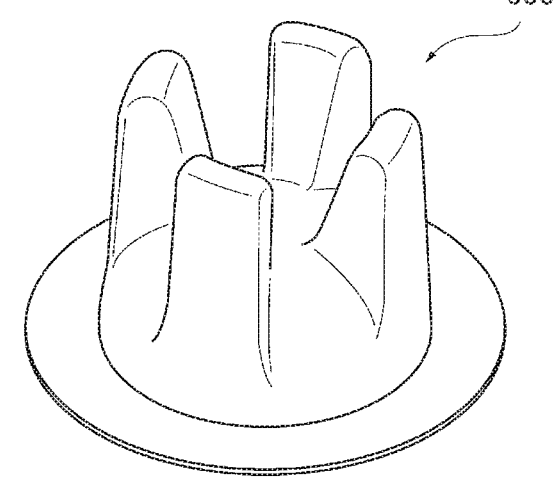
FIG. 11C shows finger portions having a long length.
Figure 12A:
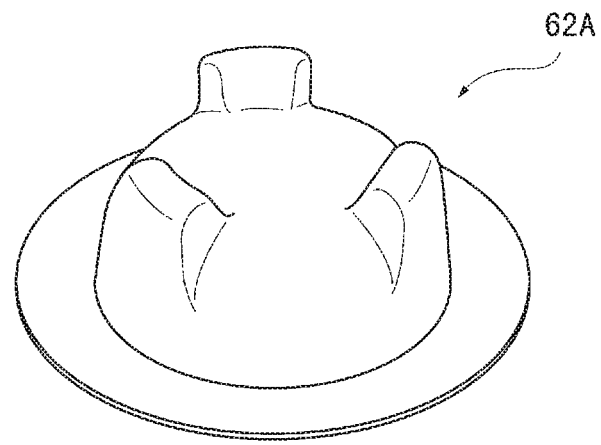
FIG. 12A shows finger portions having a short length.
Figure 12B:
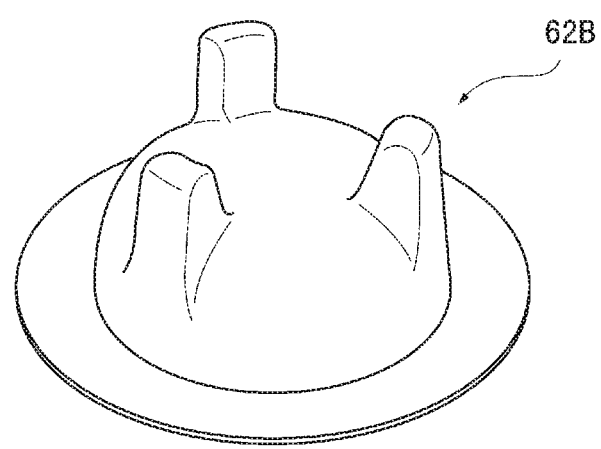
FIG. 12B shows finger portions having a medium length.
Figure 12C:
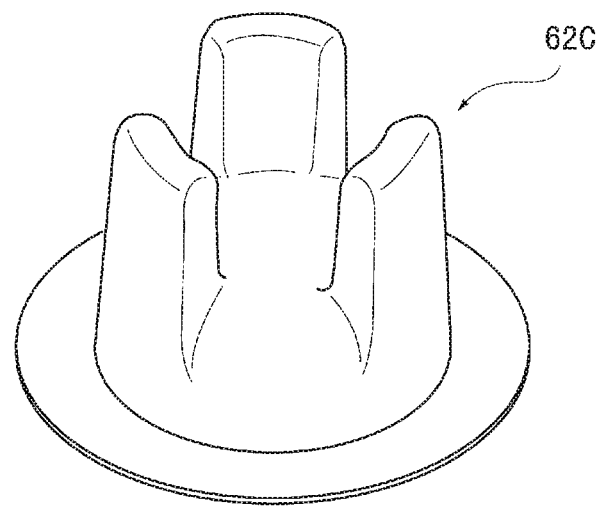
FIG. 12C shows finger portions having a long length.

In the above embodiments, the gripping body having a length of the finger portion in FIG. 2 has been described, but the present invention is not limited to this. For example, as gripping bodies 28B, 28C, 28D in FIGS. 10A to 10C, the length of the finger portion may be changed as appropriate depending on the intended use. A size of the palm portion may be also changed according to the length of the finger portion. The number of the finger portions may be four like gripping bodies 60A, 60B, 60C in FIG. 11A to 11C, three like gripping bodies 62A, 62B, 62C in FIG. 12A to 12C, or five or more (not shown).

In the above embodiments, the shape holding portion 38 being the cylindrical member has been described. However, the present invention is not limited to this, but the shape holding portion 38 may be a frame-like member of, for example, an oval shape, a polygonal shape, or an elliptical shape in a plan view. The outer shape of the shape holding portion may be changed as appropriate according to the shape of the gripping body. The guide bore of the shape holding portion may have a polygonal shape, not limited to the circular shape. The shape holding portion 38 including the holding surface 48 has been described. However, the present invention is not limited to this, but the holding surface 48 may be omitted. In this case, the cylindrical case 51 is used and an outer peripheral surface of the case 51 can serve as the holding surface.

Figure 13:
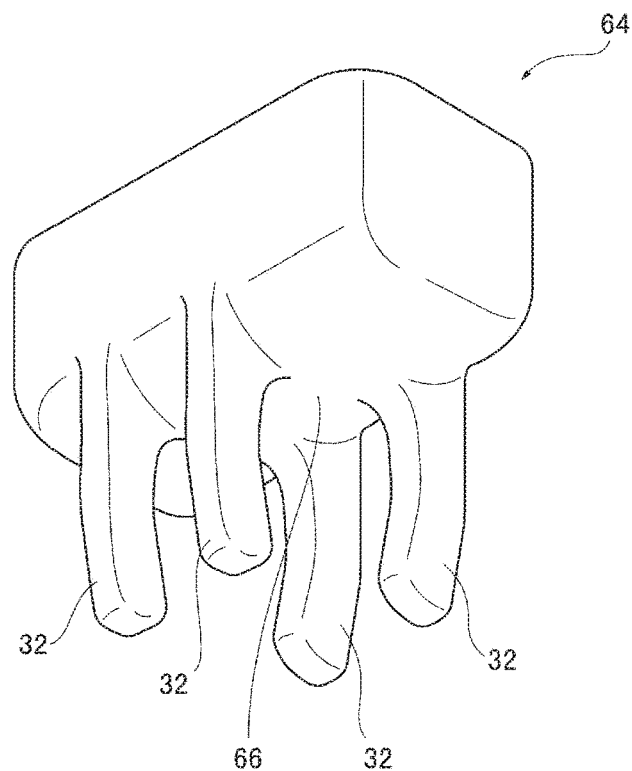
FIG. 13 is a perspective view of Modified example (4) of the gripping body according to the embodiment.

A gripping body 64 in FIG. 13 is an example of a rectangular palm portion 66 in a plan view. The same elements as those in the first embodiment are denoted by the same reference numerals and descriptions thereof are omitted. The gripping body 64 includes a plurality of finger portions 32 protruding from a periphery of the rectangular palm portion 66. Two pairs of finger portions 32 along a long side of the palm portion 66 are provided on opposite sides of the palm portion 66. In FIG. 13, the two pairs of finger portions 32 are alternately arranged. A shape holding portion (not shown) provided in the gripping body 64 has the same configuration as in the above embodiment except for being a rectangular frame-like member that fits an outer shape of the gripping body 64, and thus descriptions thereof are omitted.

In the gripping body 64, as the palm portion 66 is deformed in a thickness direction, an inner surface of the finger portion 32 is pulled toward a center of the palm portion 66. Then, the finger portion 32 is elastically deformed to fall toward the palm portion 66. In this case, the finger portion 32 is elastically deformed to fall toward an opposite long side. Thus, the gripping device including the gripping body 64 can easily grip a long member such as of a cylindrical shape or a prism shape.

Figure 14:
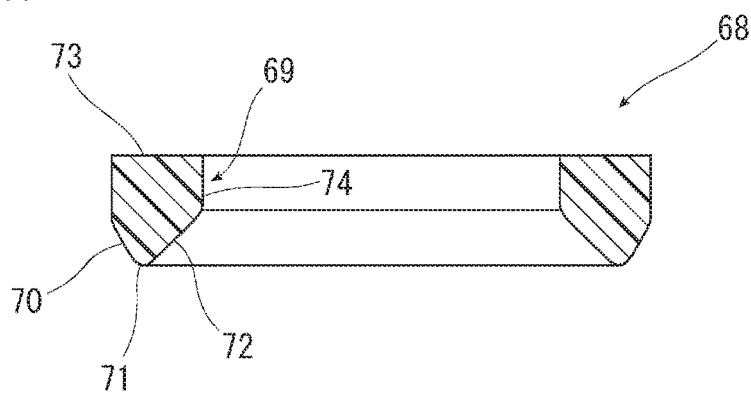
FIG. 14 is a sectional view of Modified example (2) of the shape holding portion according to the embodiment.

Next, with reference to FIGS. 14 and 15, a modified example of the shape holding portion will be described. A shape holding portion 68 in FIG. 14 is a cylindrical member including a guide bore 69 that receives a deformed palm portion (not shown), and a curved portion 70 provided on an outer side of a finger-portion-side distal end 71 in an axial direction of the guide bore 69. The curved portion 70 in FIG. 14 has a flat area and an area curved to protrude outward. The shape holding portion 68 has, on the side of the finger-portion-side distal end 71, an inner peripheral surface 72 formed so that an inner diameter of the guide bore 69 gradually decreases from the finger-portion-side distal end 71 toward a base end 73. The inner peripheral surface 72 in FIG. 14 is conical and tapered from the finger-portion-side distal end 71 toward the base end 73, and is connected to a cylindrical bore 74 on the side of the base end 73.

Figure 15:
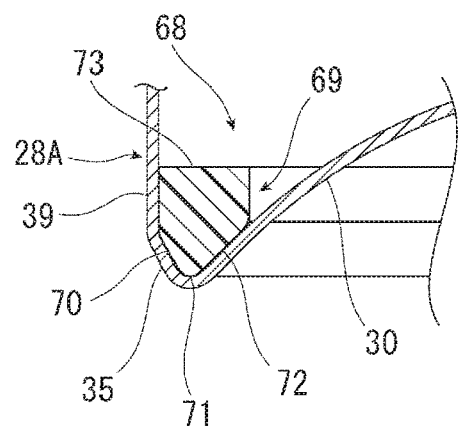
FIG. 15 is a partial sectional view of Modified example (2) of the shape holding portion according to the embodiment.

When the pressure in the gripping body 28A is reduced, the palm portion 30 is sucked into the guide bore 69 and deformed along the inner peripheral surface 72 in the thickness direction (FIG. 15). Since the inner peripheral surface 72 is conical and tapered from the finger-portion-side distal end 71 toward the base end 73 of the shape holding portion 68, the palm portion 30 is more gradually deformed than in the above described embodiment (FIG. 6). Thus, a force applied from the finger-portion-side distal end 71 of the shape holding portion 68 to the gripping body 28A is distributed to reduce a load on the gripping body 28A. As such, preventing a sudden deformation of the palm portion 30 in the thickness direction prevents an excessive load from being applied from the finger-portion-side distal end 71 to the gripping body 28A. This can prevent damage to the gripping body 28A and improve durability of the gripping body 28A.

In the above embodiments, the base end of the elastic portion 34 having a planar shape has been described, but the present invention is not limited to this. For example, the base end of the elastic portion 34 may have a curved shape that fits the curve of the curved portion 49 or 70. In this case, the base end of the elastic portion 34 is preferably brought into surface contact with the curved portion 49 or 70. Thus, no space is created between the curved portion 49 or 70, the elastic portion 34, and the inner side of the gripping body, thereby preventing a partial recess of the gripping body when the pressure is reduced. This can more stably elastically deform the finger portion 32 and improve durability of the gripping body.

REFERENCE SIGNS LIST 10 gripping device
12 industrial robot
28A to 28D, 60A to 60C, 62A to 60C, 64 gripping body 30, 66 palm portion
32 finger portion
34 elastic portion
38, 56, 68 shape holding portion
39 outer peripheral surface
40, 69 guide bore
49, 70 curved portion
72 inner peripheral surface

The invention claimed is:

1. A gripping device comprising:
a bag-shaped gripping body including:
   a palm portion; and
   a plurality of finger portions protruding from a periphery of the palm portion and configured to fall toward the palm portion by deforming the palm portion in a thickness direction;
a plurality of elastic portions respectively provided in the plurality of finger portions, each of the plurality of elastic portions having a shape of each of the plurality of finger portions; and
a shape holding portion provided in the bag-shaped gripping body to prevent contraction of an outer periphery of the palm portion, the shape holding portion being a frame-like member including:
   a guide bore configured to receive the palm portion when being deformed;
   a curved portion provided on an outer side of a distal end of the shape holding portion in an axial direction of the guide bore, the distal end facing the plurality of finger portions; and
   an inner peripheral surface formed so that an inner diameter of the guide bore gradually decreases from the distal end facing the plurality of finger portions toward a base end.

2. The gripping device according to claim 1, wherein the plurality of elastic portions are integrated with the plurality of finger portions, respectively.

3. The gripping device according to claim 1, wherein
the shape holding portion is a cylindrical member, and
a ratio of an outer diameter of the shape holding portion and an inner diameter of the guide bore is 1.0:0.93 to 1.0:0.5.

4. The gripping device according to claim 1, wherein in a plan view, the distal end of the shape holding portion is located on a radially outer side of respective center positions of the plurality of elastic portions.

5. The gripping device according to claim 1, wherein the shape holding portion includes a plurality of protrusions respectively protruding toward the plurality of finger portions in positions corresponding to the plurality of elastic portions.

6. An industrial robot comprising the gripping device according to claim 1.

* * * * *